(12) United States Patent
Kruse

(10) Patent No.: US 9,663,054 B2
(45) Date of Patent: May 30, 2017

(54) DISPLACEABLE AIRBAG CUSHION SAFETY SYSTEMS AND RELATED METHODS

(71) Applicant: Autoliv ASP, Inc., Ogden, UT (US)

(72) Inventor: Dion Karl-Axel Kruse, Alingsås (SE)

(73) Assignee: AUTOLIV ASP, INC., Ogden, UT (US)

( * ) Notice: Subject to any disclaimer, the term of this patent is extended or adjusted under 35 U.S.C. 154(b) by 36 days.

(21) Appl. No.: 14/792,076

(22) Filed: Jul. 6, 2015

(65) Prior Publication Data

US 2017/0008475 A1  Jan. 12, 2017

(51) Int. Cl.
| | |
|---|---|
| *B60R 21/203* | (2006.01) |
| *B62D 1/11* | (2006.01) |
| *B60R 21/017* | (2006.01) |
| *B60R 21/01* | (2006.01) |

(52) U.S. Cl.
CPC ........ *B60R 21/0173* (2013.01); *B60R 21/203* (2013.01); *B62D 1/11* (2013.01); *B60R 2021/01231* (2013.01); *B60R 2021/01252* (2013.01); *B60R 2021/01286* (2013.01)

(58) Field of Classification Search
CPC .. B62D 1/10; B62D 1/11; B62D 1/183; B60R 2021/01252; B60R 2021/0233; B60R 2021/0273; B60R 2021/161; B60R 21/203; B60R 2021/0009
See application file for complete search history.

(56) References Cited

U.S. PATENT DOCUMENTS

| | | | |
|---|---|---|---|
| 5,507,521 A | 4/1996 | Steffens, Jr. | |
| 7,455,319 B2 | 11/2008 | Haglund et al. | |
| 9,452,725 B2 * | 9/2016 | Lorenz | ................ B60R 21/0134 |

FOREIGN PATENT DOCUMENTS

| | | | | |
|---|---|---|---|---|
| DE | 4105821 | | 8/1992 | |
| DE | 102009014687 | | 10/2010 | |
| EP | 1057712 | | 12/2000 | |
| GB | 2300606 A | * | 11/1996 | ............... B62D 1/11 |
| JP | 09142311 | | 6/1997 | |
| SE | 200002509 | | 7/2000 | |
| WO | WO2008130281 | | 10/2008 | |

OTHER PUBLICATIONS

Concise Explanation of Relevance of EP1057712.
Concise Explanation of Relevance of JP09142311.
Concise Explanation of Relevance of DE4105821.
Concise Explanation of Relevance of DE102009014687.
Concise Explanation of Relevance of SE200002509.

* cited by examiner

*Primary Examiner* — Ruth Ilan
(74) *Attorney, Agent, or Firm* — Phillips Ryther & Winchester; Matthew D. Thayne

(57) ABSTRACT

Apparatus, methods, and systems for repositioning an airbag cushion prior to and/or during deployment of the airbag cushion resulting from an impact event. Some embodiments may comprise one or more sensors, which may be used to detect at least a first directional component of an impact with a vehicle. A steering wheel actuator may be provided to move a vehicle steering wheel laterally in a direction opposite from a lateral component of the impact in response to a signal from the one or more sensors. The system may further comprise an airbag cushion configured to be positioned, following deployment, in a location corresponding with lateral movement caused by the steering wheel actuator.

13 Claims, 4 Drawing Sheets

DISPLACEABLE AIRBAG CUSHION SAFETY SYSTEMS AND RELATED METHODS

SUMMARY

Injuries associated with oblique load vehicle impacts are often difficult to mitigate, even using current airbag systems. For example, during such impacts, chest and/or head injuries often occur due to an occupant rolling or sliding off of the airbag cushion, and seatbelt systems may not be capable of providing sufficient restraint to prevent such injuries.

The present inventors have therefore determined that it would be desirable to provide systems and methods that overcome one or more of the foregoing limitations and/or other limitations of the prior art. For example, the present inventors have determined that, by providing, in some embodiments, safety systems that may operate in conjunction with an airbag system to move the position of the steering wheel and/or another structure from which an airbag cushion exits to account for the direction of the impact, the ability of the airbag cushion to prevent injuries, particularly for oblique impacts, may be improved.

Thus, in some embodiments and implementations, an airbag cushion may be repositioned prior to and/or during deployment of the airbag cushion resulting from an impact event. In preferred embodiments and implementations, the airbag cushion may be repositioned by displacing the steering wheel of a vehicle, which may house the airbag cushion. In some such embodiments and implementations, the direction and/or distance of the displacement may be determined by evaluating the position, angle, force, and/or other characteristics of the impact. In some embodiments, the angle of the steering wheel or other airbag cushion housing may also, or alternatively, be altered due to the impact event. The degree of such tilting may be determined based upon the impact characteristics in some embodiments.

In a more particular example of a vehicle safety system according to some embodiments, the system may comprise a first sensor, such as an accelerometer, configured to detect at least a first directional component of an impact with a vehicle, such as a lateral directional component of the impact, and a steering wheel actuator configured to move a vehicle steering wheel laterally in a direction opposite from the lateral directional component of the impact in response to a signal from at least the first sensor. An airbag cushion may be provided that may be configured to be positioned, following deployment, in a location corresponding with lateral movement caused by the steering wheel actuator.

Some embodiments may comprise a second sensor configured to detect a second directional component of the impact with the vehicle. In some such embodiments, the first sensor may be oriented at a first angle, and the second sensor may be oriented at a second angle offset from the first angle. In some such embodiments, the first angle may be offset from the second angle by about 90 degrees.

In some embodiments, the steering wheel actuator may be further configured to tilt the vehicle steering wheel in response to the signal from at least the first sensor. In some such embodiments, the steering wheel actuator may further be configured to tilt the vehicle steering wheel laterally in a direction corresponding with the direction of the impact in response to the signal from at least the first sensor.

In a specific example of a vehicle according to some embodiments, the vehicle may comprise a steering wheel, an airbag cushion configured to deploy in a location corresponding with a location of the steering wheel, and a vehicle safety system. The vehicle safety system may comprise a sensor configured to detect an impact with the vehicle, a steering wheel actuator configured to move the steering wheel laterally in response to detection of the impact, and an airbag cushion configured to be positioned, following deployment, in a location corresponding with lateral movement caused by the steering wheel actuator.

In some embodiments, the sensor may be configured to determine an angle of the impact. In some embodiments, this may be derived from a lateral component of the impact, which may also be determined from the sensor and/or other sensors.

Some embodiments may further comprise a vehicle computer system, which may be configured to receive a signal from the sensor and, upon detecting a predetermined characteristic of the impact (such as a threshold lateral component of the impact event), transmit a signal to the steering wheel actuator to move the vehicle steering wheel laterally. The vehicle computer system may further be configured to calculate a desired lateral movement distance for the steering wheel. The steering wheel actuator may be configured to move the steering wheel laterally in response to detection of the impact by a distance corresponding to the desired lateral movement distance.

In some embodiments, the steering wheel actuator may be configured to move the steering wheel in a direction opposite from a lateral component of the impact.

In an example of a method for adjusting the position of an airbag cushion during a vehicle impact event according to some implementations, the method may comprise sampling a sensor to determine a lateral component of the impact event; determining a lateral movement direction using the lateral component of the impact event; transmitting a signal to an actuator, wherein the signal comprises the lateral movement direction; and moving an airbag cushion housing in a lateral direction corresponding with the determined lateral movement direction.

Some implementations may further comprise determining whether the lateral component of the impact event exceeds a predetermined threshold.

In some implementations, the step of sampling a sensor to determine a lateral component of the impact event may comprise sampling a first sensor to determine an x-component of the impact event and sampling a second sensor to determine a y-component of the impact event. In some such implementations, the x-component is offset from the y-component by ninety degrees, or at least about ninety degrees.

Some implementations may further comprise calculating a desired lateral movement distance using the lateral component of the impact event.

In some implementations, the signal transmitted to the actuator may further comprise the desired lateral movement distance.

In some implementations, the airbag cushion housing may be positioned in a steering wheel, and the actuator may comprise a steering wheel actuator. Some such implementations may further comprise tilting the steering wheel in a lateral direction opposite from the determined lateral movement direction. In some such implementations, a tilt angle may be calculated, and the step of tilting the steering wheel may comprise tilting the steering wheel at the tilt angle.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Apparatus, methods, and systems are disclosed herein relating to repositioning of an airbag cushion prior to and/or during deployment of the airbag cushion resulting from an impact event. In preferred embodiments and implementations, the airbag cushion may be repositioned by displacing the steering wheel of a vehicle, which may house the airbag cushion. In some such embodiments and implementations, the direction and/or distance of the displacement may be determined by evaluating the position, angle, force, and/or other characteristics of the impact. In some embodiments, the angle of the steering wheel or other airbag cushion housing may also, or alternatively, be altered due to the impact event. The degree of such tilting may be determined based upon the impact characteristics in some embodiments.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
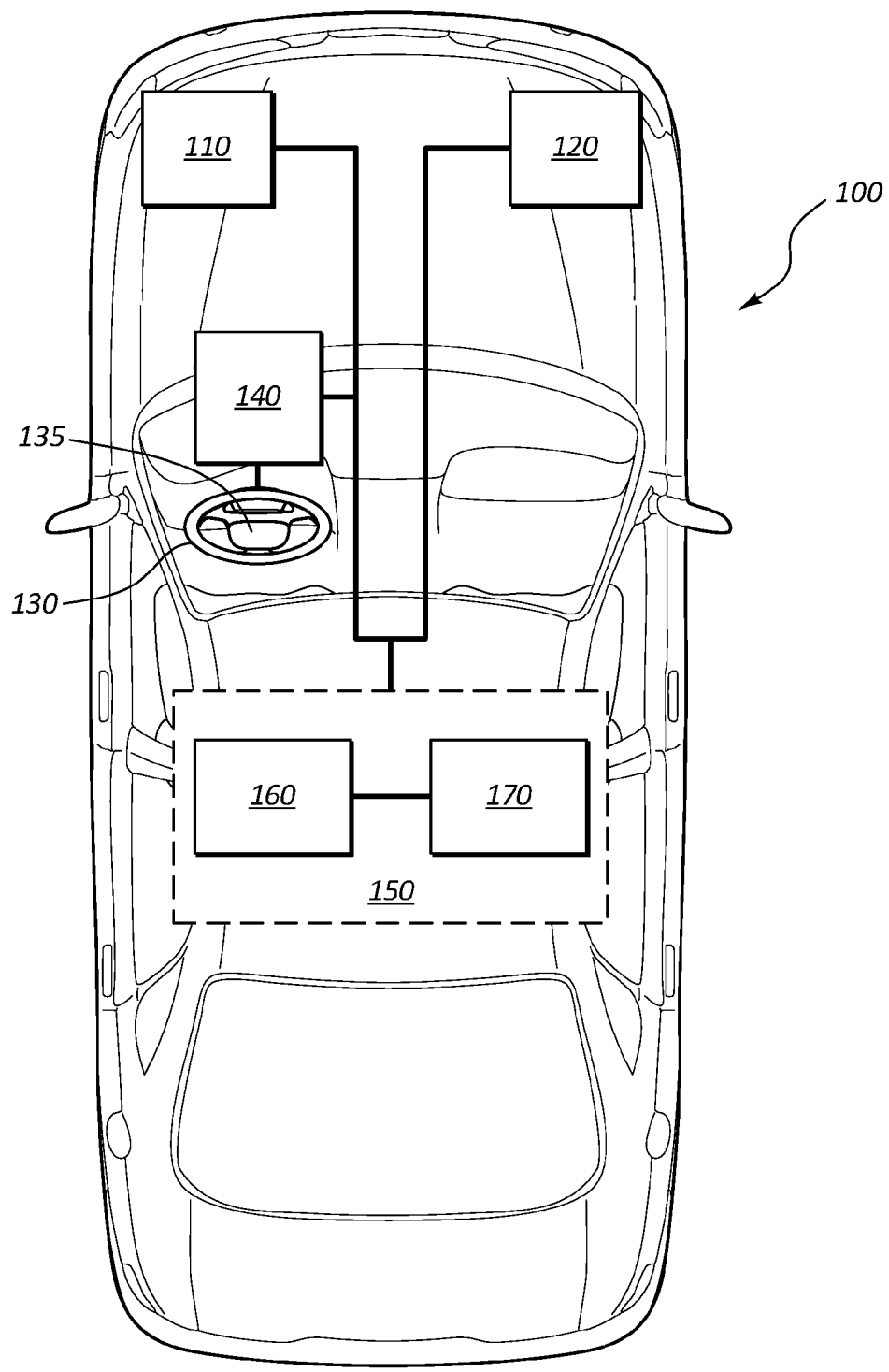
FIG. 1 is a schematic diagram illustrating a vehicle comprising a vehicle safety system having an airbag cushion and a means for moving the airbag cushion laterally according to one embodiment.

FIG. 1 depicts a vehicle 100 comprising a first sensor 110 and a second sensor 120. Sensors 110 and 120 may be configured to detect and/or predict various characteristics of a vehicle impact event, such as the direction of the impact angle relative to, for example, the airbag cushion or some other fixed point on the vehicle 100. Sensors 110 and 120 may comprise, for example, accelerometers or other suitable sensors, such as pressure sensors, sound sensors, vibration sensors, and the like. In some embodiments, first sensor 110 may comprise a first sensing axis and second sensor 120 may comprise a second sensing axis offset from the first sensing axis. In some such embodiments, the first sensing axis may be offset from the second sensing axis by ninety degrees, or at least about ninety degrees.

For example, in some embodiments, first sensor 110 may be aligned with a lateral or "x" axis direction and second sensor 120 may be aligned with a forward or "y" axis direction. By comparing signals from sensors 110 and 120, a direction of the impact may be determined. Of course, other characteristics of the impact, such as the intensity or force associated with the impact, may be obtained by sensors 110, 120, and/or other sensors. In some embodiments, pre-crash sensors, such as, for example, cameras, radar, and/or lasers, may be provided as well. Other embodiments are contemplated in which a single sensor or set of sensors may be provided.

Vehicle 100 further comprises a steering wheel 130 comprising an airbag cushion housing 135. Although preferred embodiments disclosed herein may be particularly useful for driver side airbag systems, and therefore may be used in connection with airbag systems configured to be deployed from a steering wheel 130, other embodiments are contemplated in which the airbag cushion housing may be positioned in or on another portion of the vehicle 100.

An airbag cushion housing actuator, such as a steering wheel actuator 140, may be coupled with airbag cushion housing 135 and/or steering wheel 130. Actuator 140 may comprise, for example, ball screws, guide rails, linear actuators, rack and pinion devices, motors, gears, etc. In some embodiments, actuator 140 may comprise a pyrotechnic component, which may be used to provide sufficient force within a sufficiently small time window to reposition the airbag cushion prior to and/or during the impact event. In some such embodiments, the pyrotechnic actuator may comprise, for example, a pneumatic air cylinder with a push rod and a piston, which may be configured to direct the steering wheel 130 and/or airbag cushion housing 135 laterally along a rail system. In some embodiments, the same pyrotechnic device may be used to both deploy the airbag cushion and provide force sufficient to reposition the steering wheel 130/airbag cushion housing 135.

In some embodiments, a computer system 150 may be used to coordinate the various signals involved in detecting the impact event and/or actuating the actuator 140. In some embodiments, computer system 150 may comprise electronics 160 and memory 170. Electronics 150 may comprise, for example, one or more processors, communications interfaces, and the like, as those of ordinary skill in the art will appreciate. Memory 170 may comprise random access memory (RAM) and/or a non-transitory computer-readable storage medium. In some embodiments, memory 170 may be programmable or otherwise manipulable by a technician or user to, for example, input one or more variables to alter the operation of the safety system. For example, in some embodiments, a user may alter the desired stroke distance of actuator 140 or otherwise alter the desired deployment characteristics of actuator 140 in accordance with, for example, the vehicle occupant's height, weight, and/or preferences.

In some embodiments, one or more parameters of the system, such as a stroke distance of actuator 140 and/or a tilt angle of steering wheel 130, may be associated with particular characteristics of the impact, such as a lateral component of the impact angle. In such embodiments, a look-up table or the like may be used to quickly associate the distance, angle, etc., with the impact characteristic. In other embodiments, more complicated calculations may be performed in real time during the impact and the parameters of the safety system may be adjusted in real time accordingly.

In some embodiments, computer system 150 may be a pre-existing computer system of vehicle 100. Alternatively, computer system 150 may be specifically part of a safety system for displacing an airbag cushion during or prior to an impact event. In some such embodiments, computer system 150 may be configured to interface with the existing vehicle computer system. The various components of the computer system 150 may be implemented using hardware, software, firmware, and/or any combination thereof.

Figure 2:
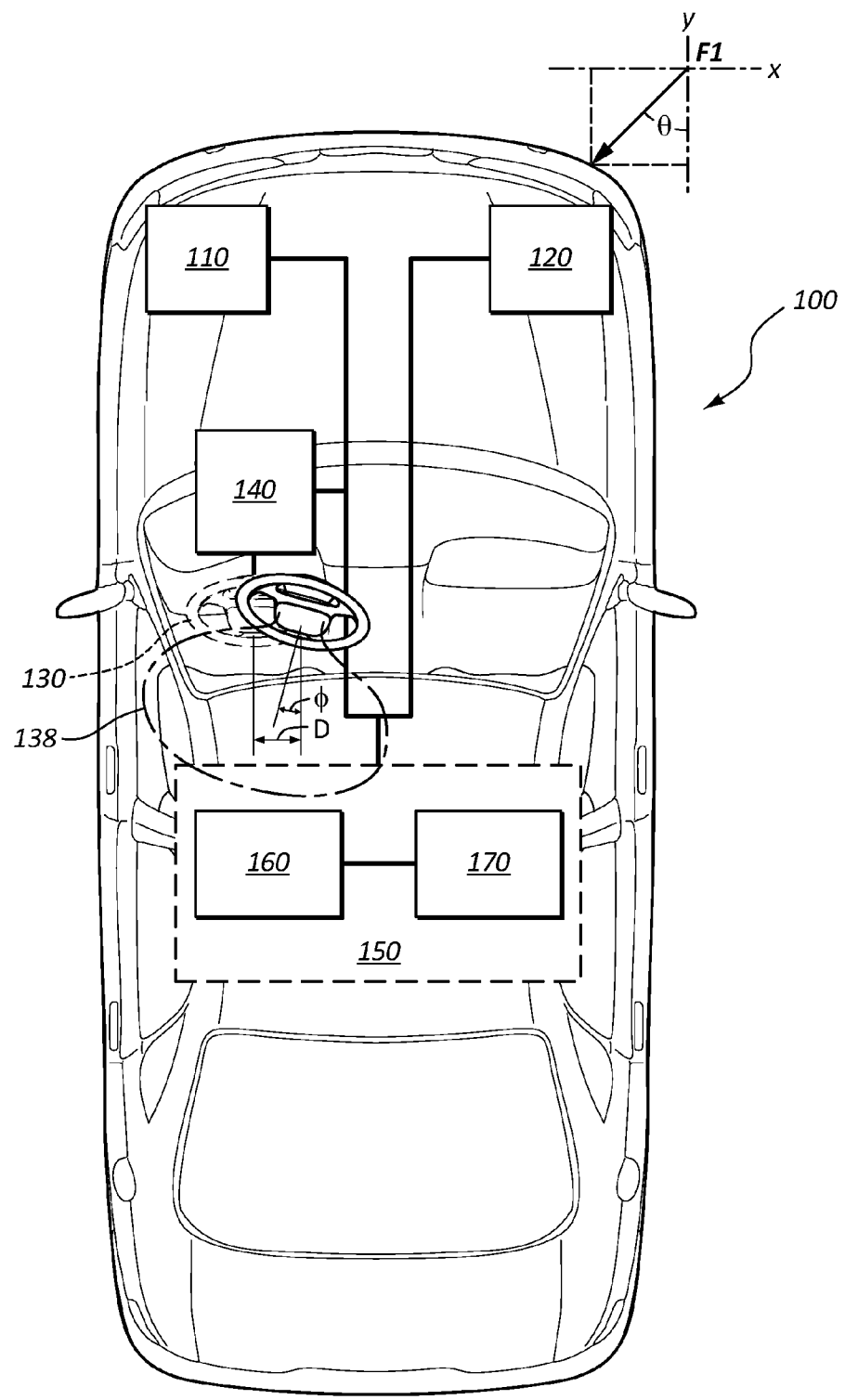
FIG. 2 is a schematic diagram illustrating the vehicle of FIG. 1 during an oblique impact event involving a lateral component.

FIG. 2 depicts vehicle 100 after undergoing an oblique impact event F1 from the right side of the vehicle. As shown in this figure, the impact event has an impact angle of θ degrees relative to a head-on impact, which would have an impact angle of zero degrees. Impact may be made up of an x-component or lateral component and a y-component or forward component, as indicated in the figure. In some embodiments, one of the sensors 110/120 may be configured to sense the x-component of the impact and the other of the sensor 110/120 may be configured to sense the y-component of the impact.

Upon detecting the angle and/or other characteristics of the impact, a signal may be send to actuator 140, which may result in movement of steering wheel 130 and/or airbag cushion housing 135. In some embodiments, as previously mentioned, signals may be continuously sent during the impact so that adjustments to actuator 140 may be made in real time. In preferred embodiments, actuator 140 may be configured to move steering wheel 130 and/or airbag cushion housing 135 laterally relative to the occupant in a direction opposite from the direction of the lateral component of the impact. In other words, because the impact in FIG. 2 was directed from right to left (from the perspective of the figure), actuator 140 has moved steering wheel 130, and thereby moved airbag cushion housing 135, in a direction from left to right. More particularly, actuator 140 has moved steering wheel 130 laterally to the right by a distance "D."

In some embodiments, distance D may be between about 25 mm and about 150 mm. Distance D may, in some embodiments, be based on the ratio between the calculated impact angle (ratio y/x, for example) and/or the distance between the driver/occupant and the airbag/steering wheel, which may be based on occupant size, seat position, etc. For example, for a common impact angle (y/x) of 15-25 degrees, the occupant distance to an inflated airbag cushion may be between about 100 mm and about 300 mm. For a 15 degree impact angle, D may be about 27 mm for an occupant positioned at a distance of 100 mm from the airbag cushion and about 80 mm for an occupant positioned about 300 mm from the airbag cushion. Distance D for occupant distances from the airbag between 100 mm and 300 mm may vary linearly in accordance with the occupant/airbag distance between 27 and 80 mm.

As another example, for an impact angle of 25 degrees, D may be about 47 mm for an occupant positioned at a distance of 100 mm from the airbag cushion and about 140 mm for an occupant positioned about 300 mm from the airbag cushion. Distance D for occupant distances from the airbag between 100 mm and 300 mm may vary linearly in accordance with the occupant/airbag distance between 47 and 140 mm. Of course, not all embodiments must be so precise. Thus, some embodiments, may comprise a plurality of "steps" or preconfigured thresholds and distance D, and/or other parameters of the safety system, may vary between such thresholds depending upon the characteristics of the impact and/or positioning/features of the occupant.

In the depicted embodiment, an airbag cushion 138 has been deployed from steering wheel 130. Because steering wheel 130 has been moved laterally in a direction opposite from the lateral component of the impact, airbag cushion 138 is in a better position to protect the occupant (the driver in the depicted embodiment) from certain common problematic aspects of oblique-angle impacts, such as occupant roll-offs or slide-offs. Moreover, the airbag cushion 138 will be in a better position to receive the occupant's head in a more central location within airbag cushion 138.

In some embodiments, actuator 140, or a different actuator, may also, or alternatively, be configured to tilt the steering wheel 130 and/or the airbag cushion housing 135. Again, preferably this tilting is done to position the airbag cushion 138 in a better position to absorb impact forces from oblique-angle impacts. Thus, with respect to the impact depicted in FIG. 2, because the impact has a lateral component directed towards the left, actuator 140 is configured to tilt steering wheel 130 in a lateral direction opposite from the lateral movement direction of steering wheel 130. In other words, whereas the steering wheel 130 is moved to the right, it is tilted to the left by an angle φ.

Figure 3:
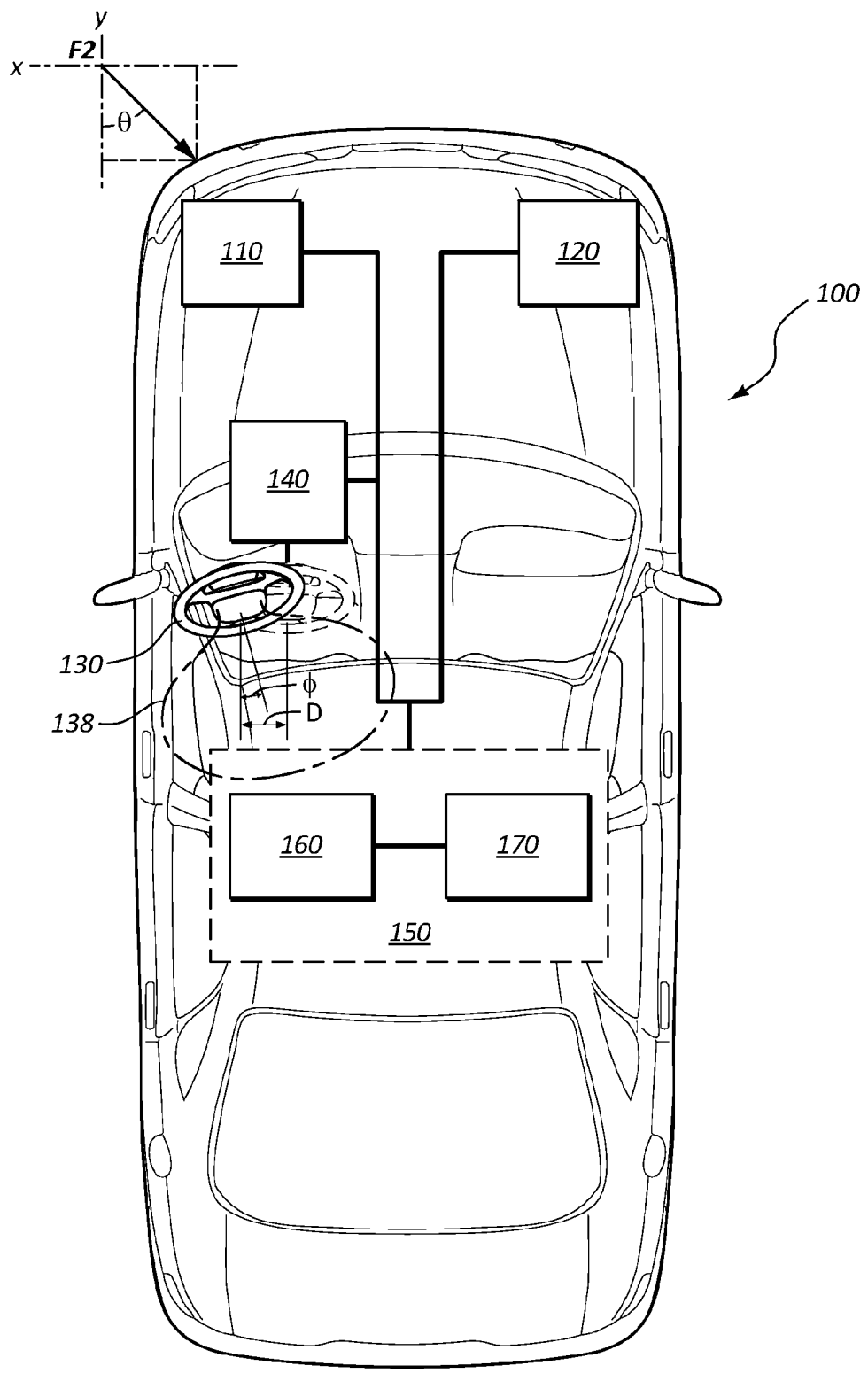
FIG. 3 is a schematic diagram illustrating the vehicle of FIG. 1 during another oblique impact event involving a lateral component opposite from the lateral component of the impact event of FIG. 2.

FIG. 3 depicts vehicle 100 upon undergoing another oblique impact event F2 in which the lateral component of the impact is directed in the opposite direction relative to that depicted in FIG. 2. Thus, impact event F2 has a lateral component that is directed to the right. As also shown in this figure, the impact event F2 has an impact angle of e degrees relative to a head-on impact. Because the lateral component of impact event F2 is directed to the right, actuator 140 has repositioned steering wheel 130 laterally to the left by a distance "D." In addition, steering wheel 130 has been tilted in a direction opposite from the lateral movement distance. Thus, steering wheel 130 has been laterally moved to the left and tilted to the right by an angle φ. Again, this position may be better suited to allow for airbag cushion 138 to prevent injury to an occupant positioned in front of airbag cushion 138 during the impact event F2.

Figure 4:
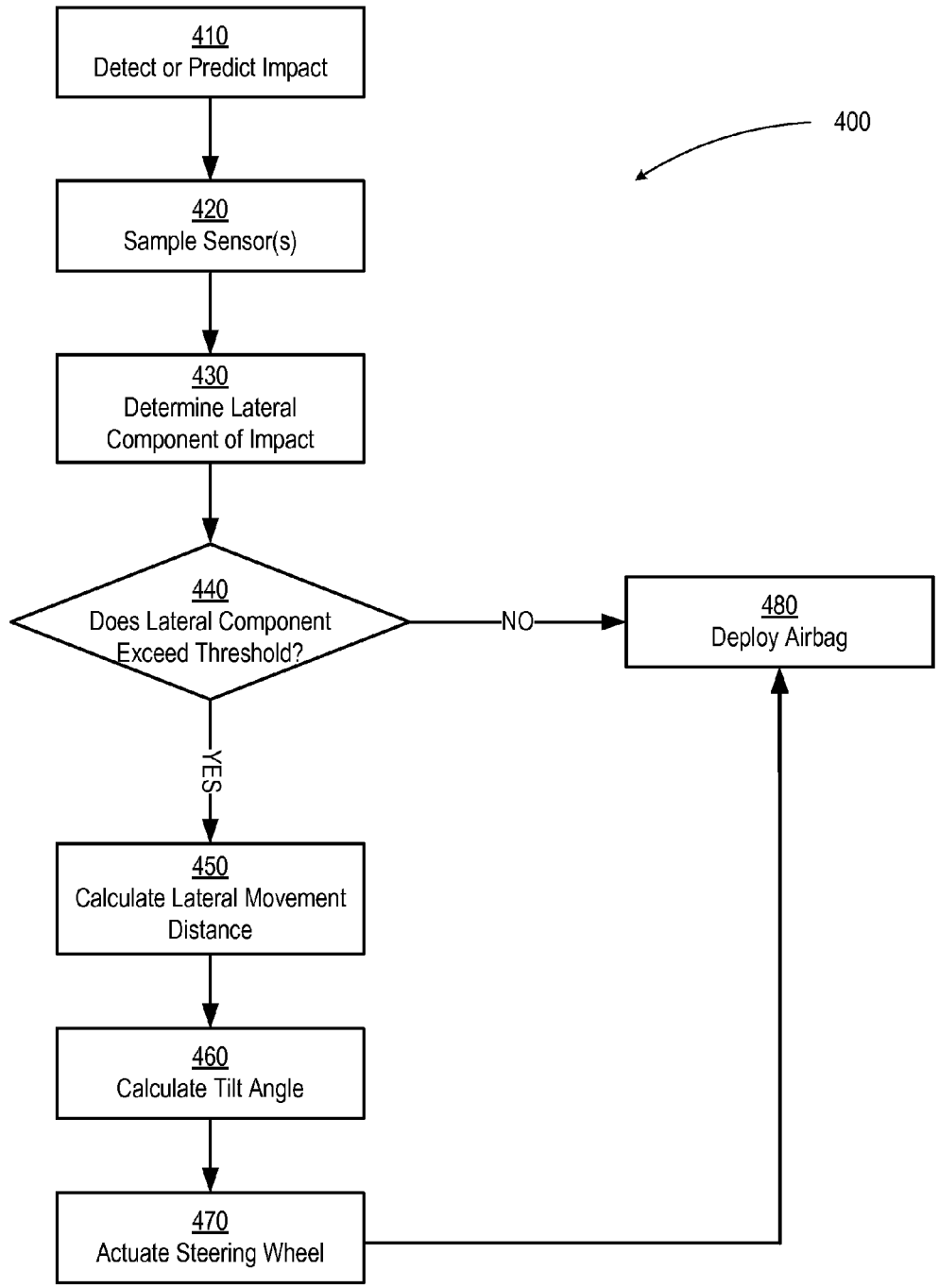
FIG. 4 is a flow chart depicting an example of a method for displacing an airbag cushion before and/or during deployment of the airbag cushion according to certain implementations.

FIG. 4 is a flow chart depicting a method 400 for displacing an airbag cushion before or during deployment of the cushion according to certain implementations. At step 410, an impact event is either detected or predicted. In some implementations, this step may comprise use of one or more sensors, such as sensors 110 and 120 from FIGS. 1-3. In implementations in which an impact is predicted, pre-crash sensors, such as cameras, radar, and/or lasers, may be used.

Step 420 may comprise sampling one or more sensors to assess characteristics of the impact. In some implementations, step 420 may comprise use of the same sensors, or at least a subset of the same sensors, used in step 410. In some implementations, steps 410 and 420 may be combined into a single step. In other words, the impact may be detected by sampling the sensor(s) in some implementations.

Step 430 comprises determining a lateral component of the impact. Thus, for example, in some implementations one or more signals from the sensor(s) may be transmitted to a computer system, such as computer system 150, which may be used to assess or compute a lateral component of the impact.

Following step 430, in some implementations, the lateral component of the impact (or an impact angle and/or impact force/severity) may be compared with a threshold to determine whether to move the airbag cushion. For example, in some implementations, the threshold for activating movement of the airbag cushion may be the same as the trigger for deploying the airbag cushion. In other implementations, the system may be reversible. In other words, the steering wheel/airbag cushion movement may be triggered prior to deployment of the airbag cushion. In some such implementations, this triggering may be based on predicted, pre-crash sensors.

Thus, in some implementations and embodiments, the actuator, such as actuator 140, may be configured to move the steering wheel and/or airbag upon detection of any impact event, or an impact event of sufficient force. If the impact event is also sufficient to trigger deployment of the airbag cushion, the cushion will then be in a better position to absorb the impact for the occupant. If, on the other hand, the impact event fails to trigger the airbag cushion deployment, the actuator may be configured to return the steering wheel and/or airbag module to its original position. Alternatively, the steering wheel and/or airbag module may be manually returned to its original position after such an event.

If the threshold lateral component is not met or exceeded, method 400 may proceed to step 480, at which point the airbag may be deployed. If, on the other hand, the threshold lateral component of the impact has been met or exceeded, which may indicate an oblique impact of sufficient force/severity in a lateral direction, method 400 may proceed to step 450.

Step 450 may comprise calculating a lateral movement distance. For example, in some implementations, step 450 may comprise using the lateral component of the impact determined at step 430 to determine a desired lateral movement distance of the airbag cushion (or a housing or other object, such as a steering wheel, to which the cushion is coupled). However, other implementations are contemplated in which step 450 may be omitted. In other words, a standard distance may be used for all impact events, or at least for all impact events meeting a lateral component threshold or other threshold.

Step 460 may comprise calculating a tilt angle. For implementations in which the steering wheel is moved to accomplish movement of the airbag cushion, as described above, the steering wheel may be tilted in a desired direction/angle in accordance with the lateral component of the impact. Although a particular angle may be calculated in certain implementations, which angle may correspond with the severity of the impact in a particular lateral direction and/or the lateral component of the impact, other implementations are contemplated in which a fixed tilt angle may be used for all impacts, or at least for all impacts meeting the threshold of step 440. Moreover, still other implementations are contemplated in which the steering wheel/airbag cushion may only be moved laterally and no tilting may be needed.

Following step 470, a signal may be transmitted to an actuator to laterally move and/or tilt the steering wheel or another component used to house the airbag cushion. In some implementations, the same actuator may be used to both laterally move and tilt the steering wheel/airbag cushion. In some implementations, the actuator used to deploy the airbag cushion may also be used to laterally move and/or tilt the steering wheel/airbag cushion.

Method 400 may then proceed to step 480 for deployment of the airbag cushion. As alluded to above, in some implementations, deployment of the airbag and the actuator may be simultaneous. In some implementations, the steering wheel/airbag cushion housing may be returned to its original position following deployment/actuation, either manually or automatically.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. A vehicle safety system, comprising:
    a first sensor configured to detect at least a first directional component of an impact with a vehicle;
    a steering wheel actuator configured to move a vehicle steering wheel laterally in a direction opposite from a lateral directional component of the impact in response to a signal from at least the first sensor; and
    an airbag cushion configured to be positioned, following deployment, in a location corresponding with the lateral movement caused by the steering wheel actuator.

2. The vehicle safety system of claim 1, wherein the first sensor comprises an accelerometer.

3. The vehicle safety system of claim 1, further comprising a second sensor configured to detect a second directional component of the impact with the vehicle.

4. The vehicle safety system of claim 3, wherein the first sensor is oriented at a first angle, and wherein the second sensor is oriented at a second angle offset from the first angle.

5. The vehicle safety system of claim 4, wherein the first angle is offset from the second angle by about 90 degrees.

6. The vehicle safety system of claim 1, wherein the steering wheel actuator is further configured to tilt the vehicle steering wheel in response to the signal from at least the first sensor.

7. The vehicle safety system of claim 6, wherein the steering wheel actuator is further configured to tilt the vehicle steering wheel laterally in a direction corresponding with the direction of the impact in response to the signal from at least the first sensor.

8. A vehicle, comprising:
    a steering wheel;
    an airbag cushion configured to deploy in a location corresponding with a location of the steering wheel; and
    a vehicle safety system, comprising:
        a sensor configured to detect an impact with the vehicle;
        a steering wheel actuator configured to move the steering wheel laterally in response to detection of the impact; and
        an airbag cushion configured to be positioned, following deployment, in a location corresponding with lateral movement caused by the steering wheel actuator.

9. The vehicle of claim 8, wherein the sensor is configured to determine an angle of the impact.

10. The vehicle of claim 8, further comprising a vehicle computer system, wherein the vehicle computer system is configured to receive a signal from the sensor and, upon detecting a predetermined characteristic of the impact, transmit a signal to the steering wheel actuator to move the vehicle steering wheel laterally.

11. The vehicle of claim 10, wherein the predetermined characteristic of the impact comprises a threshold lateral component of the impact event.

12. The vehicle of claim 10, wherein the vehicle computer system is further configured to calculate a desired lateral movement distance for the steering wheel, and wherein the steering wheel actuator is configured to move the steering wheel laterally in response to detection of the impact by a distance corresponding to the desired lateral movement distance.

13. The vehicle of claim 8, wherein the steering wheel actuator is configured to move the steering wheel in a direction opposite from a lateral component direction of the impact.

* * * * *